May 1, 1934.  J. VERDERBER  1,956,883
INDEXING DEVICE
Filed Aug. 31, 1928
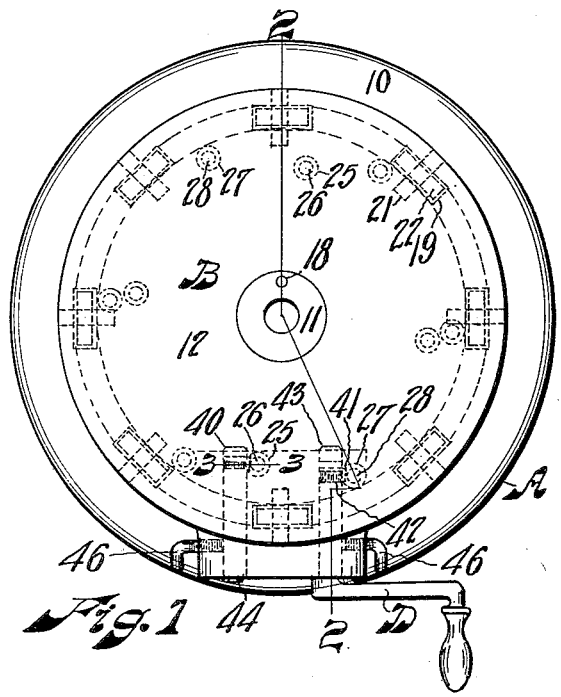
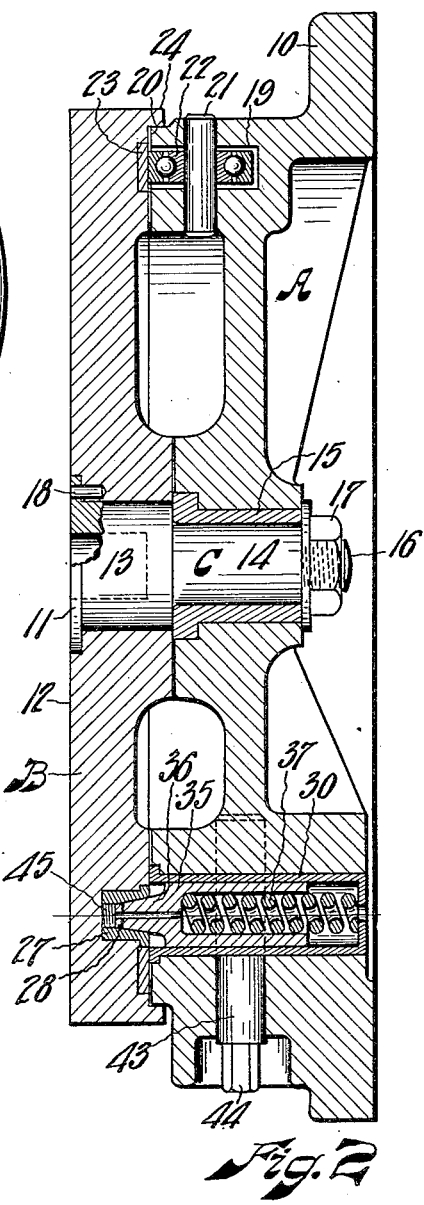
INVENTOR
Jos. Verderber
BY
C. F. Heinkel,
ATTORNEY Patented May 1, 1934

1,956,883

UNITED STATES PATENT OFFICE 1,956,883

INDEXING DEVICE

Joseph Verderber, Cleveland, Ohio, assignor to Cleveland Universal Jig Company, Cleveland, Ohio Application August 31, 1928, Serial No. 303,318

3 Claims. (Cl. 90—56)

My invention relates to devices wherein one member thereof is indexable in relation to another member thereof.

Objects of my invention are a simple, inexpensive, easily operable, efficient and lasting indexing device which can be used for either one or for various spacings or index relations, in which the joints between members and the indexing means are protected against intrusion of foreign matter, in which a friction reducing means is introduced between the members in such a manner that the member riding on the friction reducing means is not moved out of its normal position or course of movement when foreign matter gets under the same in another member, in which index members are moved positively, in which index members can be held to each other frictionally when desired, and in which a resilient means normally tends to retain index members in contact with each other. Other objects will appear, or become apparent, or will suggest themselves upon an inspection of the accompanying drawing and this specification.

I am aware that my invention is applicable in various manners and to various devices. For illustration purposes, but not for limitation purposes, I have selected a certain type device embodying my invention and have shown the same in the accompanying drawing in which:—

Fig. 1 is a plan view of an indexing device embodying my invention and having two rows of index sockets and an individual index operating means for each row and one operating handle interchangeable between both of the operating means.

Fig. 2 is a transverse section on a larger scale taken in a plane indicated by the line 2—2 in Fig. 1 and shows interior structure more clearly.

Fig. 3 is a section taken in a plane indicated by the line 3—3 in Fig. 1 and shows the gear tooth relation between index members more clearly.

The device shown in the drawing comprises, principally, the base member A having the flange 10 whereby the same can be held or fixed against movement on a machine or other device, and the table member B adjacent to the base A. In the present instance, both members are journaled together by means of the stepped journal stud C having the head 11 countersunk into the top 12 of the table member, the portion 13 fitting into the table member, the portion 14 fitting into the bushing 15 in the base member, and the threaded portion 16 with the nut 17 thereon as a retaining means to hold both members together in addition to forming the journal stud as shown. The stud C is prevented from rotation by the pin 18 extending through the head 11 and into the table member.

In the present instance, the base member has eight pockets 19 formed therein and opening into the same through the top surface 20 thereof.

The journal pins 21 are mounted in the base member and traverse the pockets and ball bearings 22 are mounted on the pins and in the pockets.

The pins and ball bearings are located so that the top of the outer circumferential surfaces of the ball bearings are all in one plane which is located very slightly above the top surface 20 of the base member. The rod means shown as the annular member 23 is mounted in the under side of the table member to form a wear resisting track for the outer circumferential surfaces of the ball bearings when the base and table members are rotated in relation to each other.

The ball bearings themselves are fixed positionally in the base member and are rotated on the pins 21 when the base and the table members are rotated in relation to each other due to the contact between the outer circumferential surface of the ball bearings on the annular member 23.

A plain roller, or a roller bearing, or other adequate means can be used in place of the ball bearings but I prefer to use ball bearings because they have a certain self aligning ability inherent in them so that inaccuracy of structure, or entrance of foreign matter, or other causes, will not affect the table member detrimentally.

The flange 24 extends downwardly from the underside of the table member and over the outside of the top portion of the base member with as little clearance as possible between them and overlaps the joint between the base and table members so that foreign matter, such as chips falling from the table member, is excluded from the member 23 and from the pockets 19 and from the bearings 22.

As shown, the pockets are wider and deeper than necessary for the ball bearings so that foreign matter can fall into the bottoms thereof in case some does enter the device and the ball bearings have some leeway sidewise to prevent binding or other disadvantages.

As shown, the top surface 12 is uninterrupted by openings or the like so that, in addition to the overlapping flange 24, foreign matter is effectively excluded from the interior of the device.

In the present instance, the device is designed to index the table member on the base member in two spacings or index relations or positions;

one being for four equal spacings and the other for six equal spacings. A device can be designed for more or less than two index relations or with unequal spacing in any one or in all of the same.

As shown, the four duplicate bushings 25 are mounted in the underside of the table member in a circular row of a definite distance or radius from the axis of the journal stud C and are spaced equally and each has the duplicate indexing socket 26 therein cross-sectionally round in the present instance. The six duplicate bushings 27 are also mounted in the underside of the table member in a circular row of a distance or radius different than the distance or radius of the circle of the bushing 25 and each has the duplicate indexing socket 28 therein cross-sectionally round in the present instance.

As shown, the cup 29, cross-sectionally round in the present instance, is mounted in the base member with the longitudinal axis thereof the same radius from the axis of the journal stud as the radius of the circle for the sockets 26. The cup 30, a duplicate of the cup 29, is also mounted in the base member a spaced distance from the axis of the journal stud as the radius of the circle for the sockets 28.

Both cups are tubular and closed at the bottom and open through the upper surface of the base member.

The cup 31 fits into and is movable longitudinally in the inside of the cup 29, is tubular and open at the bottom and closed at the top, has the indexing nose 32 at the top adapted to the sockets 26, and has the vent hole 33 through the nose so that air can escape from the upper part of the socket and out through the vent hole 34 in the bottom of the cup 29.

The compression spring E is interposed between the bottom of the cup 29 and the top of the cup 31 and normally tends to urge the cup 31 longitudinally out of the cup 29.

The cup 35, a duplicate of the cup 31, fits into and is movable longitudinally in the inside of the cup 30 and has the indexing nose 36 adapted to the sockets 28, with the compression spring 37 therein.

The sides of the sockets and noses are shown angular and this angle can be varied to suit various requirements or various inclinations. As a feature of my invention, I use what is commonly known as a sticking angle, meaning thereby an angular engagement between two members whereby the members are held to each other frictionally and automatically as a taper shank drill is held in a taper socket for instance. With the type of angle of the socket and nose walls, the nose can be forced into the socket with any desired degree of force by means of the nose moving means described below so that any desired degree of sticking of the nose in the socket can be attained. The compression spring is provided to hold the nose in the socket in case the forced engagement between the nose and the socket is not desired or has been neglected so that the nose is always retainable in the socket automatically even when the forced engagement is not used.

The cup 31 has the gear teeth rack 38 on one side thereof meshing with the gear teeth 39 on the shaft 40 journaled in the base member in proper gear teeth meshing distance from the cup 31 and the cup 29 is suitably cut away to clear the shaft 40 as the same traverses the cups.

The cup 35 has the gear teeth rack 41 on one side thereof meshing with the gear teeth 42 on the shaft 43 journaled in the base member in proper gear teeth meshing distance from the cup 35 and the cup 30 is suitably cut away to clear the shaft 43 as the same traverses the cup.

The handle D has a polygonal socket adapted to the duplicate polygonal ends 44 on the shafts 40 and 43 so that the same handle is interchangeable on either one of the shafts.

Since a feature of my invention is to prevent the intrusion of foreign matter into the interior of the device, it is necessary that the socket bushings 25 and 27 do not extend through the top of the table member. Since the top of the sockets are closed, the vents permit the escape of air from the socket and the internal threads 45 permit of a bolt or other screw device to be screwed into the same until the end thereof abuts the bottom of the countersink for the socket bushings and thereof forces the same out of the countersink when the screw is further rotated.

In order to prevent the nose for one row of index holes from entering the sockets thereof while indexing is being performed by the other nose and sockets or when the table is to be rotated without indexing the same, the screws 46 are threaded into the base member in a position to abut the shafts and thereby prevent rotation thereof and each screw is provided with the handle 47 to facilitate manual as well as wrench manipulation of the screws.

As to operation of the device shown and described:—

When one of the screws 46 holds one of the shafts against rotation and, due to the positive connection of the shaft with the index nose, prevents the nose from entering the sockets of one index row while the other screw 46 is not tightened so that the other shaft is free to rotate and, consequently, the nose operatively connected with it can freely enter the sockets of the other index row.

The table member is held against rotation when one of the noses is in one of the sockets.

A one directional rotative movement of the shaft by means of the handle inserted thereon moves the nose out of the sockets whereupon the table member can be rotated one or more index divisions whereupon the springs move the nose into the socket corresponding to the division.

The handle can be held so that one or more sockets can be skipped so that the four socket row can be used either for two or four equal spacings or for two or three unequal spacings or the six socket row can be used either for two or three or six equal spacings or for two or more unequal spacings.

As mentioned above, I am aware that my invention is applicable to various devices and in various manners. I am also aware that changes and modifications can be made in the structure as well as in the arrangement of elements shown and described within the scope of the appended claims; therefore, without limiting myself to the precise application of my invention, nor to the precise manner of applying my invention, nor to the precise structure and arrangement of elements as shown and described.

I claim:

1. An indexing device including a base, a table rotatable on said base, and a table lock and release means comprising a socket in the underside of said table, a cup fixed in and open at the top said base, a cup movable in the first said cup and having bearing therein the full length thereof and also having a nose on the outer end thereof extendable into said socket and also having a rack, a shaft rotatable in said base and having teeth meshing into said rack, a spring normally tending to move the second mentioned cup outwardly of the first mentioned cup to move said nose into said socket and to retain the same therein, and a handle to rotate said shaft to move said nose out of said socket against said spring.

2. In an indexing device, a base, a table journaled in said base to rotate axially and having a plurality of rows of indexing sockets in the bottom thereof and spaced close to the outer edge thereof, individual bearings mounted in said base close to the outer edge of said table and each having a bearing member for contact on the bottom of said table to support the same vertically, an indexing mechanism for each of said rows of sockets positionally fixed on said base and each having an index pin for the corresponding row of indexing sockets movable into and out of the sockets, a spring for each of said pins tending to move the same into said sockets and to retain the same therein, a moving means for each of said pins to move the same out of said sockets, and a locking means for each of said pins to retain the same out of said sockets.

3. An indexing mechanism including a base member and a table member adjacently thereon and journaled thereto, a hole in the adjacent side of one of said members and having a closed bottom, an indexing socket in said hole and having a closed bottom with a threaded opening through the same for removal of said socket, a tubular indexing pin in the other of said members, and a passageway between the interior of said pin and the bottom of said hole.

JOSEPH VERDERBER.